June 3, 1924. 1,496,574

F. C. FESLER

RADIUS ROD FOR AUTOMOBILES

Filed Feb. 13, 1923

Inventor
Frederick C. Fesler
By Franks Appleman,
Attorney

Patented June 3, 1924.

1,496,574

UNITED STATES PATENT OFFICE.

FREDERICK C. FESLER, OF ROSWELL, NEW MEXICO.

RADIUS ROD FOR AUTOMOBILES.

Application filed February 13, 1923. Serial No. 618,878.

*To all whom it may concern:*

Be it known that I, FREDERICK C. FESLER, a citizen of the United States of America, and resident of Roswell, in the county of Chaves and State of New Mexico, have invented certain new and useful Improvements in Radius Rods for Automobiles, of which the following is a specification.

This invention relates to radius rods for automobiles, and has for an object the provision of novel means whereby an axle of an automobile may be braced with relation to the frame, while the said brace is yieldable to a degree and capable of oscillatory movement, due to its anchorage at the end remote from the axle.

It is a further object of this invention to produce a radius rod of the character indicated having a novel anchorage by which it is secured to axle and whereby the anchorage may be readily applied to or removed from the axle.

With the foregoing and other objects in view, the invention consists in the details of construction, and in the combination and arrangement of parts to be hereinafter more fully set forth and claimed.

In describing the invention in detail, reference will be had to the accompanying drawings forming part of this application, wherein like characters denote corresponding parts in the several views, and in which—

Figure 1:
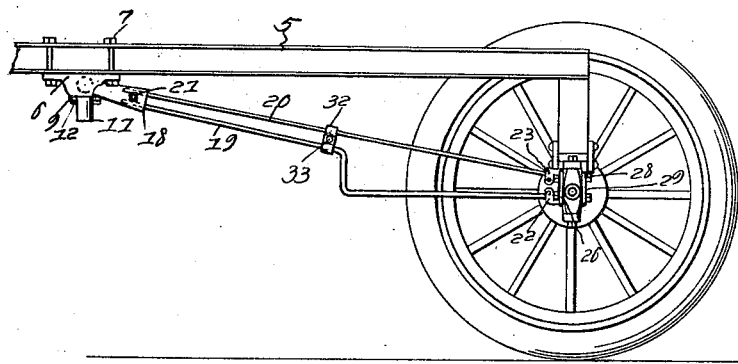
Figure 1 illustrates a view in elevation of a radius rod applied to a chassis of an automobile.
Figure 2:
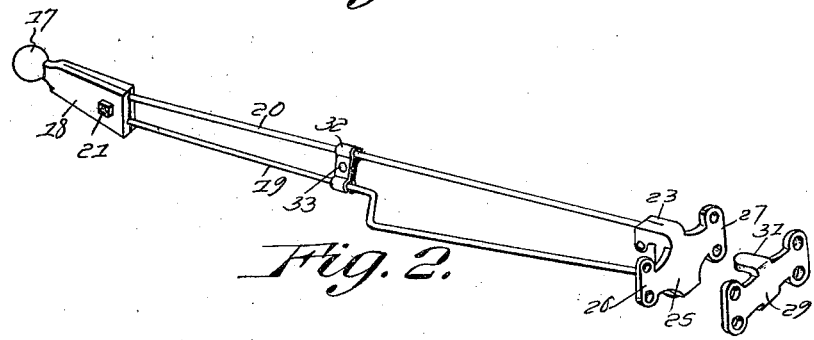
Figure 2 illustrates a view in perspectve of the radus rod and its axle anchorage.
Figure 3:
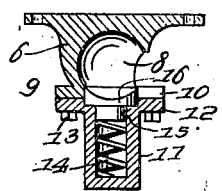
Figure 3 illustrates a sectional view of the anchor for the end of the rod remote from the axle.
Figure 4:
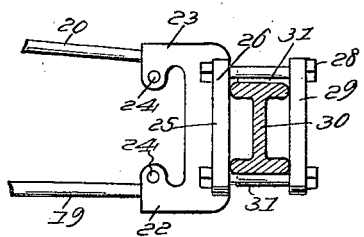
Figure 4 illustrates an enlarged sectional view of an axle showing the anchorage applied thereto.

In these drawings, 5 denotes one member of the chassis frame to which the bracket 6 is attached by fastenings 7 such as bolts or the like.

The bracket has a socket 8 and flanges 9 and 10. A cup-like extension 11 has a flange 12 which is secured to the flanges 9 and 10 by fastenings 13, such as screws or the like, and this extension forms a seat for a spring 14 which engages a shank 15 of the block 16 that lies on the upper end of the extension. The block has its upper surface recessed to form a bearing or seat for the ball 17 which fits in the socket 8, the spring serving to urge the block upwardly to force the ball into engagement with the wall of the socket.

As shown in the drawing, the ball 17 is carried by an arm 18 which, in the present embodiment of the invention, is split in order that the radius rods 19 and 20 may have their ends anchored between the sections and wherein they are secured or held by fastenings 21, such as bolts or the like.

The opposite ends of the radius rods 19 and 20 are anchored between split sections of the lugs 22 and 23 respectively, and they are held in place by fastenings 24, such as bolts or the like. The lugs 22 and 23 are preferably formed integral with a plate 25 and the plate has apertured flanges 26 and 27 which receive fastenings 28, such as bolts, by which a plate 29, of substantially the same configuration of the plate 25, is drawn into contact with the sides of the axle 30, so that the plates 25 and 29 constitute what might be termed a clamp or clip by which the radius rods are secured to the axle. The plate 29 is provided with a lip 31 which preferably overlies the axle and engages its upper edge, serving as a brace to aid in retaining the device in place and facilitating the installation of the device, since it will hold the plate while the bolts are being tightened.

The drawing shows the preferred construction for connecting the rods to the arm and to the lugs, although these may be modified within the scope of the claims without departing from the invention.

By reason of the fact that the radius rods are doubled, that is to say, arranged in pairs, the bracing action of the device when in its complete state is quite pronounced and it has proven effective in practice.

I claim:

1. In a radius rod, a plate adapted to be secured against the front axle of an automobile having an ear adapted to overlie the said axle and engage it, a coacting plate adapted to be secured against the rear side of the said axle, means extending through the said plates above and below the axle for binding them against the axle, recessed lugs integral with the last mentioned plate, radius rods extending approximately parallel to each other on different horizontal planes having their ends secured in the said recesses, and means for connecting the opposite ends of the said rods to a frame of an automobile chassis.

2. In a radius rod, two coacting plates, one of which engages the front of an axle and the other of which engages the rear of an axle, means extending through the plates above and below the axle for binding them against the axle, lugs having sockets on the rear plate, radius rods in the said sockets, means for binding the elements of the sockets against the said radius rods, and means for connecting the opposite ends of the radius rods to a chassis frame.

FREDERICK C. FESLER.